(12) United States Patent
Zhu

(10) Patent No.: US 8,792,876 B1
(45) Date of Patent: Jul. 29, 2014

(54) SYSTEM AND METHOD FOR PROVISIONING FLOWS IN A WIMAX NETWORK ENVIRONMENT

(75) Inventor: Peter P. Zhu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 678 days.

(21) Appl. No.: 12/333,718

(22) Filed: Dec. 12, 2008

(51) Int. Cl.
*H04W 4/00* (2009.01)
*H04L 12/28* (2006.01)

(52) U.S. Cl.
USPC .......... 455/422.1; 370/401; 370/338

(58) Field of Classification Search
CPC ... H04L 12/5695; H04L 12/189; H04L 47/14; H04L 67/18; H04W 12/06; H04W 28/24; H04W 68/00; H04W 88/16; H04W 48/08; H04W 4/02
USPC .......... 370/338, 342–348, 400–405; 455/422.1, 426.1–426.2, 432.1–435.3
See application file for complete search history.

(56) References Cited

U.S. PATENT DOCUMENTS

| | | | |
|---|---|---|---|
| 2007/0076607 A1* | 4/2007 | Voit et al. | 370/230 |
| 2007/0211659 A1* | 9/2007 | Li et al. | 370/329 |
| 2008/0207161 A1* | 8/2008 | Upp et al. | 455/404.1 |
| 2008/0304445 A1* | 12/2008 | Chou | 370/329 |
| 2009/0024037 A1* | 1/2009 | Baba et al. | 600/454 |
| 2009/0040993 A1* | 2/2009 | Kim et al. | 370/338 |
| 2010/0135205 A1* | 6/2010 | Li et al. | 370/328 |

FOREIGN PATENT DOCUMENTS

| | | |
|---|---|---|
| CN | 101094520 A | 12/2007 |
| CN | 101188504 A | 5/2008 |
| CN | 100442696 | 12/2008 |
| CN | 102150447 A | 8/2011 |
| EP | 1 887 809 A1 | 2/2008 |
| EP | 1 926 248 A1 | 5/2008 |
| EP | 2356829 | 8/2011 |
| WO | WO2008083621 | 7/2008 |
| WO | WO2010/068595 | 6/2010 |

OTHER PUBLICATIONS

PCT, "Notification of Transmittal (1 page) of the International Search Report (3 pages) and the Written Opinion of the International Searching Authority, or the Declaration (5 pages)," International Application No. PCT/US2009/067018 mailed Mar. 9, 2010.

(Continued)

*Primary Examiner* — Thai Hoang
(74) *Attorney, Agent, or Firm* — Patent Capital Group

(57) ABSTRACT

An apparatus is provided in one example embodiment and includes a network element coupled to a base station and a network and operating in a WiMAX communications environment. The base station is coupled to an endpoint, the network element defining authentication, authorization, and accounting (AAA) attributes for the endpoint at an interface between the network element and the base station. In more specific embodiments, the network element defines one or more quality of service attributes for the endpoint and the network element defines a layer two virtual local area network (VLAN) priority/class of service (Cos). In still other embodiments, the network element defines a layer three Internet Protocol differentiated service code point (IP-DSCP). Traffic separation can be specified on a per-subscriber basis or a per service-flow basis and, further, the traffic separation can be executed through a virtual router element.

18 Claims, 4 Drawing Sheets

(56) References Cited

OTHER PUBLICATIONS

Siemens AG (Juergen Carstens; Contact), "Congestion Control in WiMAX for BX-ASN-GW User-Plane Interface," IP.com # IPCOM000174473D, Original Publication Date Sep. 24, 2008; IP.com Electronic Publication Date Sep. 24, 2008, XP013126126, ISSN 1533-0001, © Nokia Siemens Networks 2008, 4 pages.
PCT Jun. 23, 2011 International Preliminary Report on Patentability from International Application No. PCT/US2009/067018; 6 pages.
Alvarion, "The Disruptive Approach of Open WiMAX," White Paper, © 2007, 8 pages.
EPO Jul. 20, 2011 Communication from European Application No. 09775439.
EPO Jan. 17, 2012 Response to Jul. 20, 2011 Communication from European Application No. 09775439.
EPO Oct. 16, 2012 Response to Jul. 2, 2012 Communication regarding EP Application Serial No. 09775439.
EPO Jul. 2, 2012 Communication regarding EP Application Serial No. 09775439.
EPO Mar. 14, 2013 Communication regarding EP Application Serial No. 09775439.
PRC Oct. 10, 2013 SIPO Second CN Office Action from Chinese Application No. 200980126733.3.
PRC Mar. 26, 2013 SIPO First CN Office Action from Chinese Application No. 200980126733.
PRC Aug. 6, 2013 Response to SIPO First Office Action dated Mar. 26, 2013 from Chinese Application No. 200980126733 [translation of amended Claims only].

\* cited by examiner

US 8,792,876 B1

SYSTEM AND METHOD FOR PROVISIONING FLOWS IN A WIMAX NETWORK ENVIRONMENT

TECHNICAL FIELD OF THE INVENTION

This invention relates in general to the field of communications and, more particularly, to a system and a method for provisioning flows in a WiMAX network environment.

BACKGROUND OF THE INVENTION

Networking architectures have grown increasingly complex in communication environments. One such architecture is WiMAX, which is a standards-based technology enabling the delivery of last mile wireless broadband access as an alternative to wired broadband (like cable and DSL). WiMAX provides fixed, nomadic, portable, and mobile wireless broadband connectivity without the need for a direct line-of-sight with a base station. In a typical cell radius deployment of three to ten kilometers, WiMAX systems can be expected to deliver Mbps per channel, for fixed and portable access applications. This is enough bandwidth to simultaneously support hundreds of businesses with T-1 speed connectivity and thousands of residences with DSL speed connectivity.

One area of concern associated with WiMAX protocols relates to interfaces and how to apply an appropriate quality of service (QoS) level. The ability to offer a system or a protocol that offers an effective provisioning for flows provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An apparatus is provided in one example embodiment and includes a network element coupled to a base station and a network and operating in a WiMAX communications environment. The base station is coupled to an endpoint, the network element defining authentication, authorization, and accounting (AAA) attributes for the endpoint at an interface between the network element and the base station. In more specific embodiments, the network element defines one or more quality of service attributes for the endpoint. Traffic separation can be specified on a per-subscriber basis or a per service-flow basis and, further, the traffic separation can be executed through a virtual router element.

Figure 1:
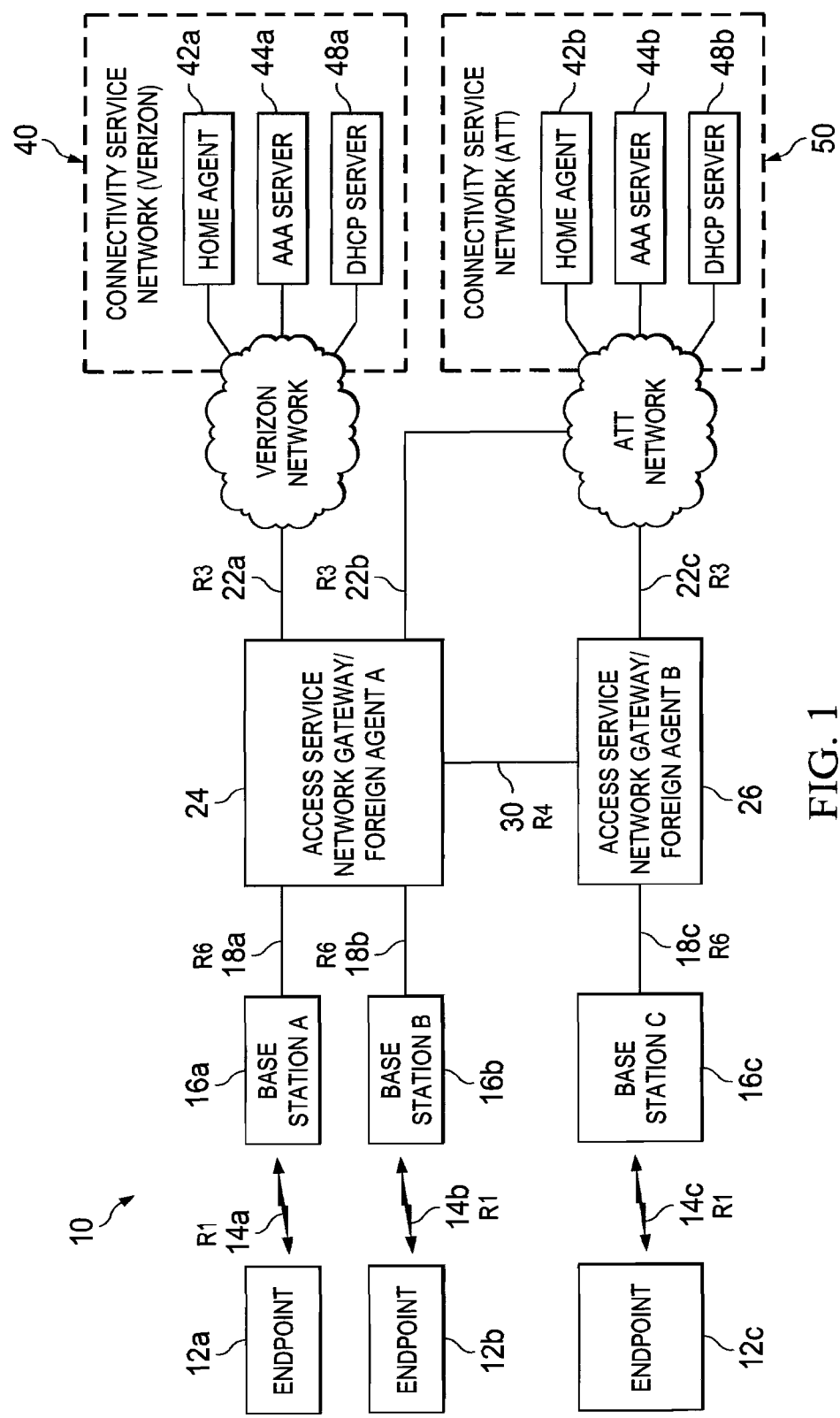
FIG. 1 is a simplified block diagram of a communication system for provisioning flows in a WiMAX network environment in accordance with one embodiment of the present invention.

Turning to FIG. 1, FIG. 1 is a simplified block diagram of a communication system 10 for provisioning flows in a WiMAX network environment. Communication system 10 may include multiple endpoints 12a-12c, which are coupled to multiple base stations 16a-16c through an interface 14a-14c (i.e., the R1 interface). Note that the base stations have been designated a letter ['A', 'B', and 'C'] for discussion purposes. Each base station (BS) may be coupled to a respective access service network gateway/foreign agent [ASNGW/FA] 24 and 26 through a series of interfaces 18a-18c (i.e., the R6 interface).

Between the gateways, there is an interface 30 provided, which is the R4 interface. A separate set of interfaces 22a-22c is also provided between the gateways and two different networks. This R3 interface, in this non-limiting example, connects to a Verizon network and an AT&T network. Each of these networks is coupled to a connectivity service network for Verizon and AT&T, which are labeled 40 and 50 respectively. Within these networks are home agents 42a-42b, authentication, authorization, and accounting (AAA) servers 44a-44b, and dynamic host configuration protocol (DHCP) servers 48a-48b.

In one example embodiment, the R1 interface is the radio wireless interface between a WiMAX terminal and the base station. Its protocol could be defined by IEEE 802.16d/e, which has well-defined quality of service (QoS) policy parameters. The R6 interface standard is defined by the WiMAX Forum Network Working Group (NWG). However, its QoS behavior is not defined and it is specified by each vendor's implementation. The R4 interface between two ASNGWs is similar to the R6 interface in that it is defined by the WiMAX NWG and lacking of QoS definitions. The R3 interface is between access service networks and connectivity service networks (CSNs). The R3 interface is also defined by the WiMAX NWG. Typically, the CSN is where the service intelligence resides.

For example, the AAA servers have the service provisioning for each subscriber. The AAA servers can be provisioned with the R1 interface QoS policy parameters on each individual subscriber basis. The AAA's R1 QoS provisioning information can be fetched by the ASNGW and passed to the base station and endpoints for enforcement. However, the NWG specification does not cover the AAA provisioning for R6, R4, and R3 interfaces for the subscriber.

Communication system 10 addresses some of these deficiencies (and others) in specifying the R4/R6/R3 interface QoS policy parameters (including layer 2 virtual local area network (VLAN) priority/class of service (CoS) and layer 3 Internet Protocol differentiated service code point (IP-DSCP)). In addition, R3 traffic separation can also be specified on a per-subscriber basis or a per service-flow basis through a virtual router mechanism. One ASNGW can connect more than one IP cloud (such as Verizon and AT&T, or a low latency and a high latency network) for the R3 interface. For example, if the end user is a Verizon subscriber, the ASNGW will send those packets to the Verizon IP cloud. The AT&T subscriber's traffic will go to the AT&T network. The other traffic separation mechanism is based on per-service-flow. If the service flow is for voice traffic, it can be routed to the low latency network and other data traffic can be routed to the high latency network. The third traffic separation can be through a VLAN ID from the AAA server for the R3 traffic.

For purposes of illustrating the techniques of communication system 10, it is important to understand the somewhat esoteric communications that may be traversing the network and that provide routing information to any given network element. The following foundational information may be viewed as a basis from which the present invention may be properly explained. Such information is offered earnestly for purposes of explanation only and, accordingly, should not be construed in any way to limit the broad scope of the present invention and its potential applications.

The WiMAX NWG specification has defined certain service flow AAA attributes for the air link (R1 interface) between a base station and an endpoint. However, there are no AAA attributes defined to describe the service flows between the base station and the ASNGW (i.e., R6 interface) or between the two ASNGWs (i.e., R4 interface).

In accordance with the techniques and teachings of the present invention, communication system 10 provides a communication approach that defines additional AAA-based attributes for the R4/R6 interface. These new AAA attributes (on per endpoint or per flow basis) include: IP differentiated service code point (DSCP) value (or mapping mechanism) for IP packet transport; Layer 2 class of service (CoS) values for L2 packet transport; Transport VLAN ID (or mapping mechanism); and service flow-based traffic separation through virtual routers for the R3 interface. These attributes will ensure the WiMAX end-to-end solution has a full quality of service (QoS) control, traffic separation, etc. Moreover, in using such a protocol, network operators can control the solution beyond the R1 interface and extend control to the R6, R4, and R3 interfaces.

Before turning to some of the operations of this architecture, a brief discussion is provided about some of the infrastructure of FIG. 1. Endpoints 12a-12c are clients or customers wishing to initiate a communication in communication system 10 via some network. The term 'endpoint' may be inclusive of devices used to initiate a communication, such as a computer, a personal digital assistant (PDA), a laptop or electronic notebook, a cellular telephone, or any other device, component, element, or object capable of initiating voice, audio, or data exchanges within communication system 10. Endpoints 12a-12c may also be inclusive of a suitable interface to the human user, such as a microphone, a display, or a keyboard or other terminal equipment. Endpoints 12a-12c may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

ASNGW/FAs 24 and 26 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, servers, or any other suitable device, component, element, or object operable to exchange information in a network environment. The network elements may include a foreign agent or not be provided with such a component depending whether Mobile IP is supported or not. Moreover, these network elements may include any suitable hardware, software, components, modules, interfaces, or objects that facilitate the operations thereof. This may be inclusive of appropriate algorithms and communication protocols that allow for the effective exchange of data or information.

In one example implementation, the network elements (i.e., items #24 and #26) include software to achieve the provisioning operations, as outlined herein in this document. In other embodiments, this feature may be provided external to the network elements or included in some other network device to achieve this intended functionality. Alternatively, both the network elements and the base stations include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving provisioning in a network environment.

Each of these components (the network elements and the base stations) can also include memory elements for storing information to be used in achieving the provisioning operations as outlined herein. Additionally, each of these devices may include a processor that can execute software or an algorithm to perform the provisioning activities as discussed in this Specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

AAA servers 44a-44b are server programs that handle requests by other network elements on behalf of endpoints for access to networking resources. Networking resources refers to any device, component, or element that provides some functionality to endpoints communicating in communication system 10. For a corresponding network, AAA servers may also provide authentication, authorization, and accounting services and management. Authorization generally refers to the process of giving endpoints permission to do or to access something. In multi-user computer systems, a system administrator may define for the system which end users are allowed access to given data in the system and, further, what privileges are provided for endpoints. Once an end user has logged into a network, the network may wish to identify what resources the end user is given during the communication session. Thus, authorization within communication system may be seen as both a preliminary setting up of permissions by a system administrator and the actual checking or verification of the permission values that have been set up when the end user is attempting access. Authentication generally refers to the process of determining whether the end user is in fact who or what it is declared to be.

The AAA servers typically interact with network access and gateway servers, and with databases and directories containing user information. One standard by which devices or applications communicate with an AAA server is the Remote Authentication Dial-In User Service (RADIUS), while other standards that could be employed include the Terminal Access Controller Access Control System (TACACS) or DIAMETER.

AAA servers may receive the IP address and other parameters from any suitable source, such as a dynamic host configuration protocol (DHCP) server or a domain name system (DNS) database element, in order to direct data to be communicated to an end user. The AAA server may include any suitable hardware, software, component, or element that operates to receive data associated with an end user and provides corresponding AAA related functions to network components within communication system 10. Authorization and IP address management may be retrieved by the AAA server from a layer two tunneling protocol network server (LNS), which may be provided to address secure services for the end user where appropriate. The assigned IP address may be a private or a routable IP address. On assignment of the IP address, the DHCP server may perform update procedures for updating the assigned IP address and leasing parameters for the end user.

Home agents 42a-42b cooperate with DHCP servers during IP registration in order to assign an IP address to end users. On authentication, an end user may be assigned an IP address by the home agent. The DHCP server may subsequently update the DNS database before returning the IP address and other provisioned parameters to an end user. An IP tunnel may be established between the network and the home agent to enable secure end-to-end packet transport.

The foreign agent (FA) [potentially included within the aforementioned network elements] are routing elements that could also be included within a network access server (NAS) on a network that allows a node to utilize a home network address. It tunnels datagrams to, and detunnels datagrams from, the home agent for the given home network.

Figure 2:
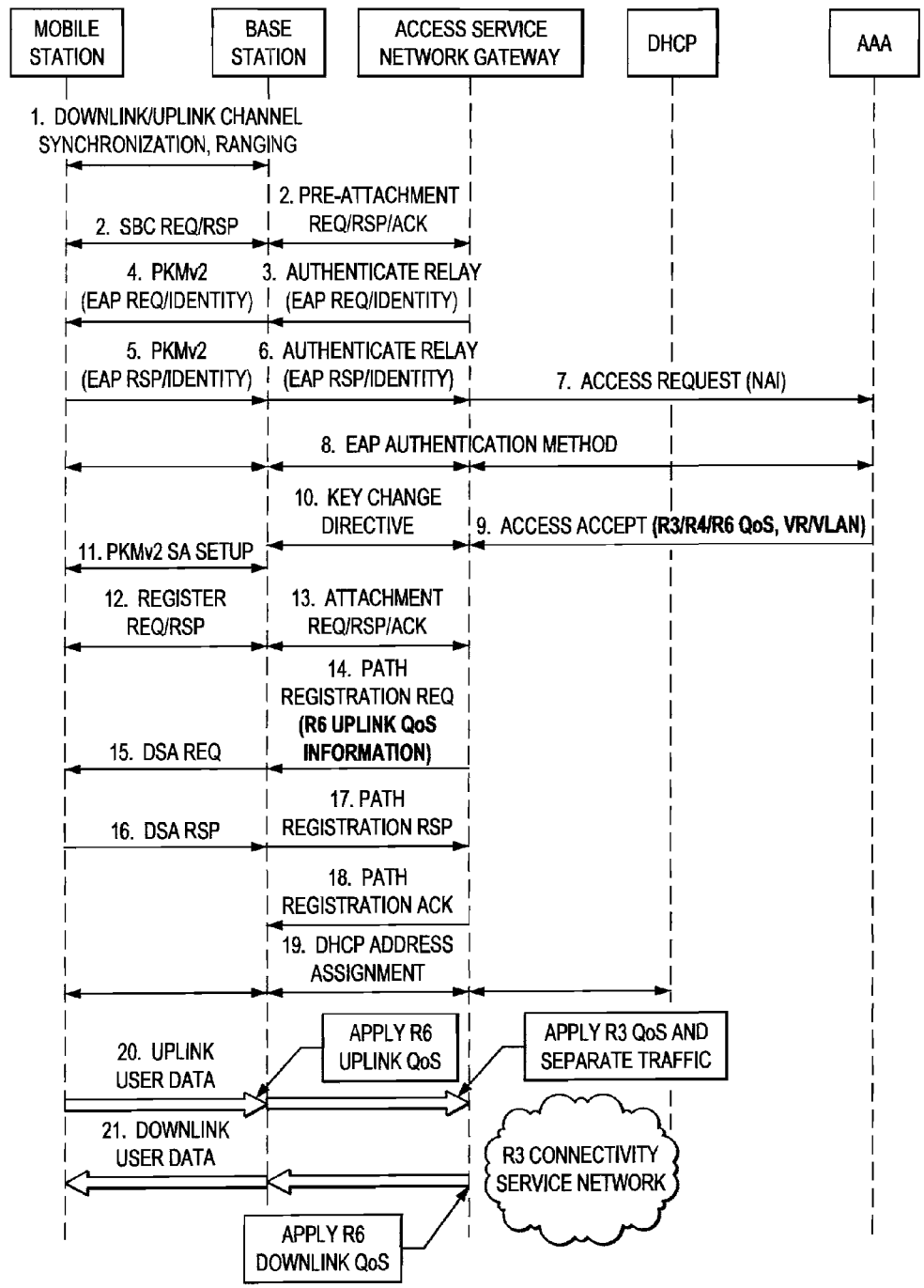
FIG. 2 is a simplified call flow illustrating a series of example steps associated with the communication system.

Turning now to the example flow of FIG. 2, FIG. 2 is a simplified flowchart that includes a series of example steps associated with an operation of communication system 10. The illustration of FIG. 2 has been provided for purposes of teaching only and, therefore, should be construed as such. Specifically, this flow uses a mobile station (MS), along with an ASNGW specifically, while alternatives to both of these items are clearly within the broad scope of the present invention.

This call flow for an initial network entry begins at step 1, where the downlink (DL) channel acquisition occurs. Also in step 1 is the MAC synchronization and the obtaining of uplink (UL) channel parameters. There is also an initial ranging RNG-REQ/RNG-RSP message exchange. The mobile station, performing an initial network entry, will send a ranging message without serving a base station ID parameter, thus, indicating that it performs initial entry and not handoff [HO] (as specified in IEEE 802.16e).

At step 2, the mobile station sends the SBC-REQ message initiating a basic capabilities negotiation between the mobile station and base station. The parameters negotiated include: PKM protocol version; authorization policy; and message authentication code mode. The SBC-REQ will trigger the base station to start the pre-attachment procedure.

At step 3, an authenticator in the selected ASN gateway can initiate the EAP authentication procedure with the mobile subscriber station. The trigger for this can be the pre-attachment-ACK message from the base station informing the ASNGW that the SBC-RSP has been sent to the mobile station. The authenticator function of the ASN gateway can send the EAP Request/Identity message to the base station using the R6 AuthRelay-EAP-Transfer message. At step 4, the base station relays the EAP Request/Identity payload of the Auth-Relay-EAP-Transfer message in the PKMv2 EAP-Transfer/PKM-RSP message to the mobile subscriber station.

At step 5, the mobile subscriber station responds with an EAP Response/Identity message containing the Network Access Identifier (NAI). This message can be sent to the base station in the PKMv2 EAP-Transfer/PKM-REQ message. At step 6, the base station relays the EAP payload received in PKMv2 EAP-Transfer to the Authenticator using the AuthRelay-EAP-Transfer message.

At step 7, the EAP payload is sent to the AAA server from the authenticator (e.g., in the ASNGW or provided elsewhere) via the collocated AAA client using a RADIUS Access-Request message. The EAP payload can be encapsulated in the RADIUS "EAP message" attribute(s). At step 8, the EAP authentication process (tunneling EAP authentication method) can be performed between the mobile subscriber station and the AAA Server via the authenticator function of the ASN gateway. The base station provides a relay of the EAP payload between PKMv2 EAP-Transfer messages and AuthRelay-EAP-Transfer messages.

At step 9, the authenticator receives a RADIUS Access-Accept message from the AAA server indicating successful completion of EAP-based authentication (including the mobile station authorization profile and the required security context (i.e. mobile station key)). Along with the standard parameters in the Access Accept message, the proposed R3/R4/R6 QoS policy parameters and Virtual Router (VR) name and/or VLAN ID is also included. At step 10, the ASNGW/Authenticator sends the Key Change Directive message to the base station to indicate completion of the EAP authentication process. At step 11, the PKMv2 3-way handshake (SA-TEK-Challenge/Request/Response exchange) is conducted between the base station and the mobile subscriber station to verify the AK (Authentication Key) to be used and to establish the security association(s) pre-provisioned for the mobile subscriber.

At step 12, when PKMv2 3-way handshake is completed, the mobile subscriber station proceeds with 802.16e registration procedure by sending a REG-REQ message, as specified in IEEE 802.16E-2005. At step 13, the base station forwards the result of the PKMv2 3-way handshake to the ASN gateway/Authenticator using, for example, a mobile station attachment request message. At step 14, the ASN Gateway sends the Path Registration Request to the base station and tries to setup the data path (GRE tunnel) between the base station and itself. This message not only contains QoS policy parameters for the R1 interface but also for the R6 QoS policy parameters as well. The base station will apply it to its uplink user data for the R6 interface.

At step 15, the base station sends a DSA-Request to the mobile station to create the service flow with the proper QoS for the R1 interface. At step 16, the mobile station replies with DSA-response. At step 17, the base station sends a path registration response back to the ASNGW. The ASNGW acknowledges this with a Path Registration ACK at step 18. At step 19, the mobile station initiates a DHCP procedure to acquire an IP address. After that, the mobile station is ready to send and receive user data traffic. At step 20, when the mobile station's uplink user data reaches the base station, the base station will apply the R6 QoS policy parameters (IP DSCP, or VLAN CoS/priority) to the traffic. The user data goes through the R6 GRE tunnel. When the data traffic further reaches the ASNGW, the traffic is de-tunneled and further R3 QoS policy parameters are applied. Next, the ASNGW will check to see if a Virtual Router (VR) is needed for the traffic. If a VR is needed, traffic separation is performed through this VR. At step 21, for downlink user data, the ASNGW can apply its downlink R6 QoS policy parameters from AAA before sending it to the base station, and the base station further sends the data to mobile station.

Figure 3:
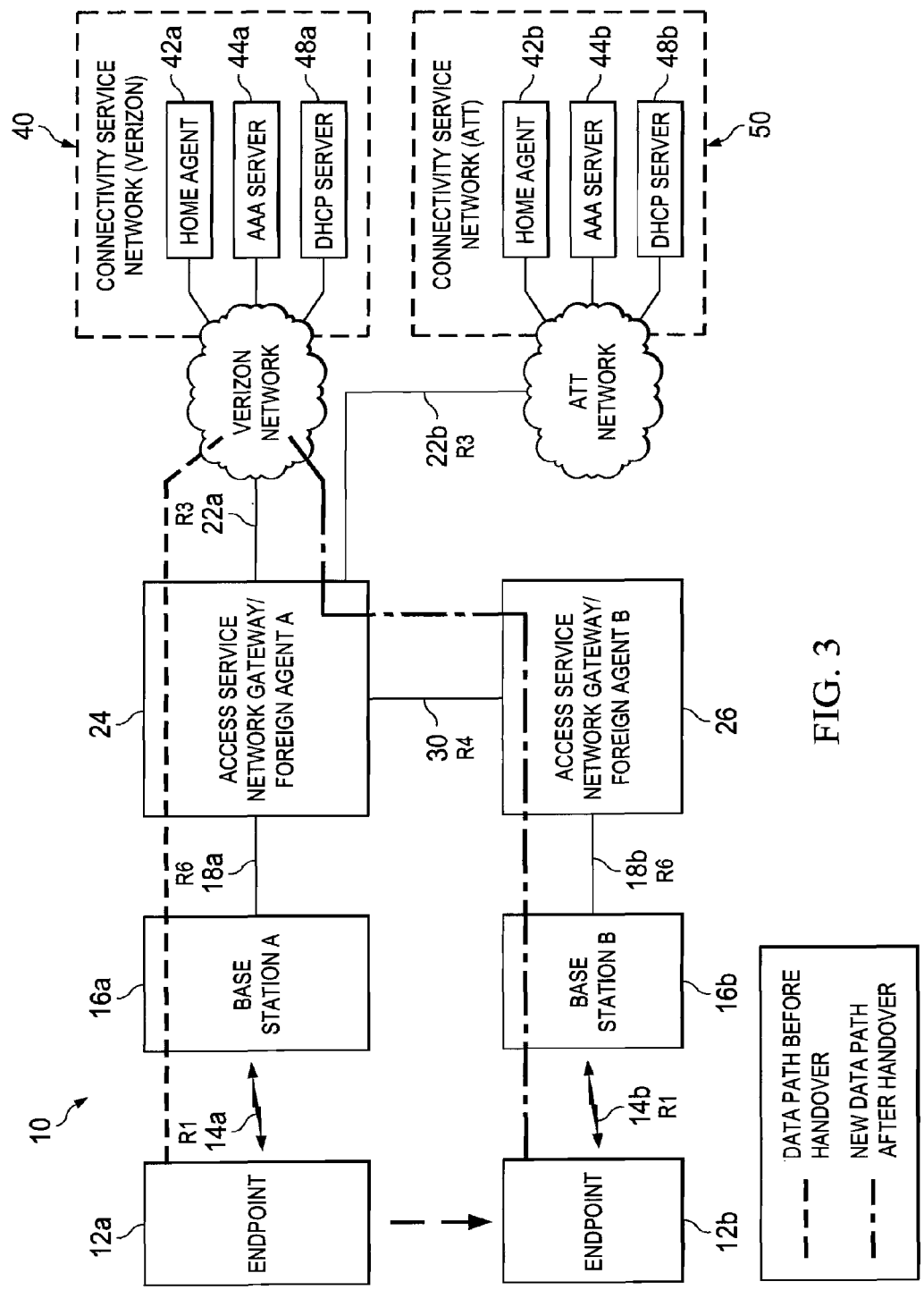
FIG. 3 is a simplified block diagram of an example in which the communication system is accommodating a handover scenario in accordance with one embodiment of the present invention.

FIG. 3 is a simplified block diagram of a call flow architecture for accommodating an Inter-ASNGW handover in accordance with one example embodiment. In this case, there is a data path before the handover, along with a new data path after the handover, as depicted in FIG. 3. In this example flow, the mobile station is moving from a first base station to a second base station and this triggers the handover.

Figure 4:
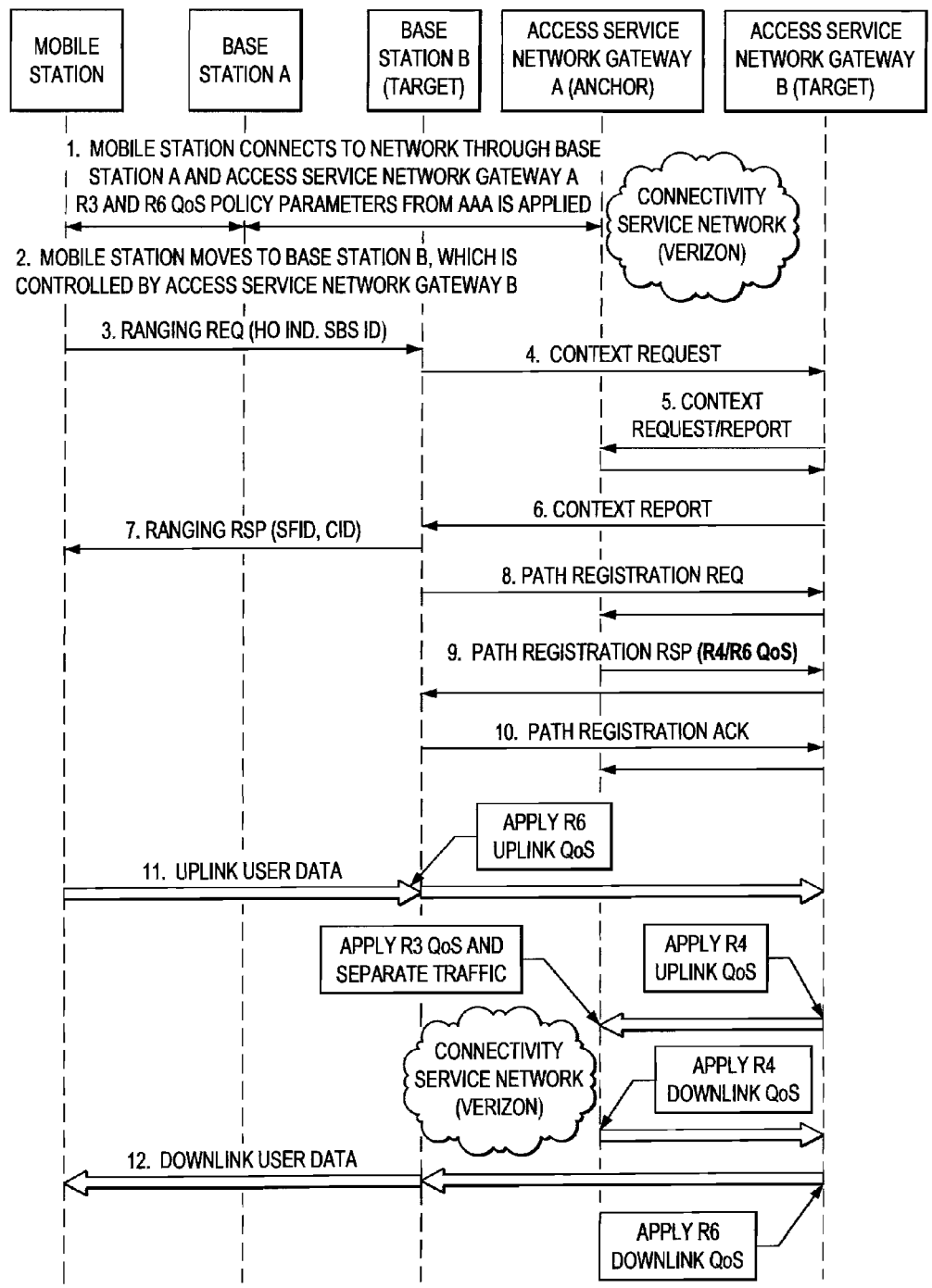
FIG. 4 is a simplified call flow illustrating a series of example steps associated with the handover embodiment of the communication system.

FIG. 4 is an example call flow for the inter-ASNGW handover, which is related to FIG. 3. Note that some of the unrelated procedures during handover are not displayed in this flow for clarity purposes. The example call flow begins at step 1, where the mobile station connects to the mobile network through base station-1 and ASNGW-1. Its R1/R3/R6 QoS policy parameters are applied, as outlined previously. At step 2, the mobile station moves away from base station-1 towards base station-2, which is controlled by ASNGW-2. In this example, base station-2 is called the "target base station."

At step 3, the mobile station performs ranging and passing the serving base station (Sbase station) ID to target base station-2. At step 4, base station-2 sends a Context Request to ASNGW2. At step 5, since the mobile session is anchored at ASNGW-1, the ASNGW2 further sends the Context Request to ASNGW1, where the mobile session context is stored. ASNGW1 replies with Context Report to ASNGW2. At step 6, the ASNGW2 further sends the mobile session context to base station-2 with a Context Report. At step 7, base station-2 responds to the mobile station with a Ranging Response. At step 8, base station-2 sends a Path Registration Request to ASNGW2. Since the mobile session is anchored at ASNGW1 (which has also downloaded from AAA QoS policy parameters), the ASNGW2 further sends the Path Registration Request to ASNGW1.

At step 9, the ASNGW1 sends back a Path Registration Response to ASNGW2, in which the R4/R6 QoS policy parameters are included. ASNGW2 further sends the Path Registration Response to base station-2, which contains the R6 QoS policy parameters. At step 10, base station-2 sends a Path Registration ACK to ASNGW2, which further forwards the information to ASNGW1. Now, a new data path between the mobile station, base station-2, ASNGW2, and ASNGW1 has been established. This new path is also depicted in FIG. 3.

At step 11, when the mobile station's uplink user data reaches base station-2, base station-2 will apply the uplink R6 QoS policy parameters (IP DSCP, or VLAN CoS/priority) to the traffic. The user data can be sent through the R6 GRE tunnel. When the GRE-tunneled data traffic further reaches ASNGW2, ASNGW2 can apply the R4 QoS policy parameters and send it to ASNGW1 through the R4 GRE tunnel. When the data finally reaches ASNGW1, it can be de-tunneled and the R3 QoS policy parameters are applied by ASNGW1. Next, the ASNGW1 can check to see if a Virtual Router (VR) is needed for the traffic. If a VR is needed, traffic separation can be performed through this VR. For downlink user data, the ASNGW1 can apply its downlink R4 QoS policy parameters from the AAA before sending it to the ASNGW2. ASNGW2 will further apply its R6 QoS policy parameters and send the data to base station-2, which forwards it to the mobile station through the R1 air interface. This activity is depicted by step 12.

Thus, the QoS parameters can be provisioned in AAA on per endpoint or per service flow basis. Furthermore, an endpoint can have multiple service flows at any time when it connects to a network. This would apply to typical service flows such as voice-over-IP service flows, video service flows, http data service flows, etc. QoS control on per service-flow basis is normally preferred because it allows control with finer granularity compared to control per endpoint basis.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIGS. 2 and 4 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving certain AAA, registration, and routing protocols, communication system 10 may be applicable to other exchanges, routing protocols, or routed protocols in which packets (not necessarily the routing protocol/packets described) are exchanged in order to provide AAA information, QoS parameters, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
defining authentication, authorization, and accounting (AAA) attributes for an endpoint, the AAA attributes comprising a quality of service (QoS) policy parameter for an R6 interface between a network element and a base station, wherein the network element operates in a WiMAX communications environment and the base station is coupled to the endpoint;
receiving at the network element an indication of successful completion of authentication, the indication including the AAA attributes for the endpoint;

forwarding a key change directive to the base station to indicate successful completion of authentication;

verifying an authentication key to be used for communication with the endpoint;

forwarding results of the verifying to the network element;

transmitting a path registration request to set up the path between the base station and the network element, wherein the path registration request includes the QoS policy parameter for the R6 interface;

communicating one or more packets to the endpoint in accordance with QoS policy parameter, wherein the communicating comprises applying the QoS policy parameter for the R6 interface to endpoint uplink packets at the base station and applying the QoS policy parameter for the R6 interface to endpoint downlink packets at the gateway; and providing a per-service-flow traffic separation for the endpoint such that if a service flow is for voice traffic, it is routed to a low latency network and data traffic is routed to a high latency network.

2. The method of claim 1, further comprising:
defining a layer two virtual local area network (VLAN) priority/class of service (CoS).

3. The method of claim 1, further comprising:
defining a layer three Internet Protocol differentiated service code point (IP-DSCP).

4. The method of claim 1, wherein traffic separation is specified on a per-subscriber basis or a per service-flow basis.

5. The method of claim 1, further comprising:
defining a second interface between the network element and a second network element.

6. Logic encoded in non-transitory media for execution and when executed by a processor operable to perform operations, comprising:

defining authentication, authorization, and accounting (AAA) attributes for an endpoint, the AAA attributes comprising a quality of service (QoS) policy parameter for an R6 interface between a network element and a base station, wherein the network element operates in a WiMAX communications environment and the base station is coupled to the endpoint;

receiving at the network element an indication of successful completion of authentication, the indication including the AAA attributes for the endpoint;

forwarding a key change directive to the base station to indicate successful completion of authentication;

verifying an authentication key to be used for communication with the endpoint;

forwarding results of the verifying to the network element;

transmitting a path registration request to set up the path between the base station and the network element, wherein the path registration request includes the QoS policy parameter for the R6 interface;

communicating one or more packets to the endpoint in accordance with QoS policy parameter, wherein the communicating comprises applying the QoS policy parameter for the R6 interface to endpoint uplink packets at the base station and applying the QoS policy parameter for the R6 interface to endpoint downlink packets at the gateway; and providing a per-service-flow traffic separation for the endpoint such that if a service flow is for voice traffic, it is routed to a low latency network and data traffic is routed to a high latency network.

7. The logic of claim 6 being further operable to:
define a layer two virtual local area network (VLAN) priority/class of service (CoS); and define a layer three Internet Protocol differentiated service code point (IP-DSCP).

8. An apparatus, comprising:
a network element;
a processor, the network element being coupled to a base station and a network and operating in a WiMAX communications environment, wherein the base station is coupled to an endpoint, the network element being configured for:

defining authentication, authorization, and accounting (AAA) attributes for an endpoint, the AAA attributes comprising a quality of service (QoS) policy parameter for an R6 interface between a network element and a base station, wherein the network element operates in a WiMAX communications environment and the base station is coupled to the endpoint;

receiving at the network element an indication of successful completion of authentication, the indication including the AAA attributes for the endpoint;

forwarding a key change directive to the base station to indicate successful completion of authentication;

verifying an authentication key to be used for communication with the endpoint;

forwarding results of the verifying to the network element;

transmitting a path registration request to set up the path between the base station and the network element, wherein the path registration request includes the QoS policy parameter for the R6 interface;

communicating one or more packets to the endpoint in accordance with QoS policy parameter, wherein the communicating comprises applying the QoS policy parameter for the R6 interface to endpoint uplink packets at the base station and applying the QoS policy parameter for the R6 interface to endpoint downlink packets at the gateway; and providing a per-service-flow traffic separation for the endpoint such that if a service flow is for voice traffic, it is routed to a low latency network and data traffic is routed to a high latency network.

9. The apparatus of claim 8, wherein the network element defines a layer two virtual local area network (VLAN) priority/class of service (Cos).

10. The apparatus of claim 8, wherein the network element defines a layer three Internet Protocol differentiated service code point (IP-DSCP).

11. The apparatus of claim 8, wherein traffic separation is specified on a per-subscriber basis or a per service-flow basis.

12. The apparatus of claim 11, wherein the traffic separation is executed through a virtual router element.

13. The apparatus of claim 8, wherein the network element defines a second interface between itself and a second network element.

14. The apparatus of claim 13, wherein the second interface defines authentication, authorization, and accounting (AAA) attributes for the endpoint.

15. The apparatus of claim 13, wherein the second interface defines one or more quality of service attributes for the endpoint.

16. The apparatus of claim 13, wherein the first and second network elements coordinate a handover for the endpoint such that a new data path is defined between the first and second network elements.

17. A system, comprising:
means for defining authentication, authorization, and accounting (AAA) attributes for an endpoint, the AAA attributes comprising a quality of service (QoS) policy parameter for an R6 interface between a network element and a base station, wherein the network element operates in a WiMAX communications environment and the base station is coupled to the endpoint;

means for receiving at the network element an indication of successful completion of authentication, the indication including the AAA attributes for the endpoint;

means for forwarding a key change directive to the base station to indicate successful completion of authentication;

means for verifying an authentication key to be used for communication with the endpoint;

means for forwarding results of the verifying to the network element;

means for transmitting a path registration request to set up the path between the base station and the network element, wherein the path registration request includes the QoS policy parameter for the R6 interface;

communicating one or more packets to the endpoint in accordance with QoS policy parameter, wherein the communicating comprises applying the QoS policy parameter for the R6 interface to endpoint uplink packets at the base station and applying the QoS policy parameter for the R6 interface to endpoint downlink packets at the gateway;

means for defining one or more quality of service attributes for the endpoint, wherein traffic separation is specified on a per-subscriber basis or a per service-flow basis; and means for providing a per-service-flow traffic separation for the endpoint such that if a service flow is for voice traffic, it is routed to a low latency network and data traffic is routed to a high latency network.

18. The system of claim 9, further comprising:

means for defining a second interface between the network element and a second network element, wherein the first and second network elements coordinate a handover for the endpoint such that a new data path is defined between the first and second network elements.

* * * * *